(12) United States Patent
Lovelace et al.

(10) Patent No.: US 10,795,946 B2
(45) Date of Patent: Oct. 6, 2020

(54) METHOD OF REDIRECTING SEARCH QUERIES FROM AN UNTRUSTED SEARCH ENGINE TO A TRUSTED SEARCH ENGINE

(71) Applicants: Aaron F. Lovelace, Honolulu, HI (US); Ciarán S. Thompson, Honolulu, HI (US); Steven M. Markowitz, Honolulu, HI (US)

(72) Inventors: Aaron F. Lovelace, Honolulu, HI (US); Ciarán S. Thompson, Honolulu, HI (US); Steven M. Markowitz, Honolulu, HI (US)

(73) Assignee: BEESTRIPE LLC, Honolulu, HI (US)

( * ) Notice: Subject to any disclaimer, the term of this patent is extended or adjusted under 35 U.S.C. 154(b) by 842 days.

(21) Appl. No.: 14/725,593

(22) Filed: May 29, 2015

(65) Prior Publication Data
US 2015/0347582 A1 Dec. 3, 2015

Related U.S. Application Data

(60) Provisional application No. 62/005,739, filed on May 30, 2014.

(51) Int. Cl.
| | | |
|---|---|---|
| *H04L 29/06* | (2006.01) | |
| *G06F 16/951* | (2019.01) | |
| *G06F 21/57* | (2013.01) | |
| *G06F 21/62* | (2013.01) | |
| *G06F 21/60* | (2013.01) | |

(52) U.S. Cl.
CPC ............ *G06F 16/951* (2019.01); *G06F 21/57* (2013.01); *G06F 21/60* (2013.01); *G06F 21/6227* (2013.01); *G06F 21/6263* (2013.01)

(58) Field of Classification Search
CPC ....................................................... G06F 16/951
USPC ............................................................ 726/22
See application file for complete search history.

(56) References Cited

U.S. PATENT DOCUMENTS

| | | | | |
|---|---|---|---|---|
| 7,653,870 B1* | 1/2010 | Knauft | ................... | G06F 16/313 715/205 |
| 8,250,080 B1* | 8/2012 | Guha | ................. | G06F 17/30887 707/705 |
| 8,332,415 B1* | 12/2012 | Adarsh | .................... | G06F 16/30 707/749 |
| 8,887,239 B1* | 11/2014 | Jain | ........................ | G06F 21/128 726/3 |
| 9,152,716 B1* | 10/2015 | Triandopoulos | ..... | G06F 16/9535 |
| 2006/0075499 A1* | 4/2006 | Edwards | ................. | G06F 21/56 726/24 |

(Continued)

*Primary Examiner* — Harris C Wang (57) ABSTRACT

A method of redirecting search queries from an untrusted search engine to a trusted search engine is a software application that is used to prevent personal information from being collected by untrusted search engines. The software application receives a search query URL for a desired search engine which corresponds to a search query. The search query is compared to a provided plurality of untrusted URL patterns in order to determine if the desired search engine can be trusted. If the search query URL is not found on in the plurality of untrusted URL patterns, the search is allowed to proceed. If the search query URL is found in the plurality of untrusted URL patterns, the search query is redirected to a trusted search engine. At least one trusted URL pattern is provided so that the search can be redirected to a trusted search engine.

1 Claim, 8 Drawing Sheets

(56) References Cited

U.S. PATENT DOCUMENTS

| | | | |
|---|---|---|---|
| 2007/0016938 A1* | 1/2007 | Lin | H04L 63/145 |
| | | | 726/3 |
| 2008/0016147 A1* | 1/2008 | Morimoto | G06F 17/30864 |
| | | | 709/203 |
| 2009/0112805 A1* | 4/2009 | Garbow | G06F 16/9535 |
| 2012/0023570 A1* | 1/2012 | Gorodyansky | H04L 63/0407 |
| | | | 726/12 |
| 2012/0296743 A1* | 11/2012 | Velipasaoglu | G06Q 30/0251 |
| | | | 705/14.54 |
| 2015/0127635 A1* | 5/2015 | Eizik | G06F 16/951 |
| | | | 707/722 |
| 2015/0347582 A1* | 12/2015 | Lovelace | G06F 21/57 |
| | | | 707/706 |

* cited by examiner

METHOD OF REDIRECTING SEARCH QUERIES FROM AN UNTRUSTED SEARCH ENGINE TO A TRUSTED SEARCH ENGINE

The current application claims a priority to the U.S. Provisional Patent application Ser. No. 62/005,739 filed on May 30, 2014.

FIELD OF THE INVENTION

The present invention relates generally to internet search queries which are made by a user computer and sent to some external server which receives and fulfills the query. More specifically, the present invention is a method of redirecting search queries from an untrusted search engine to a trusted search engine. The present invention is designed to monitor outgoing Hypertext Transfer Protocol (HTTP) requests and use Uniform Resource Locators (URLs) to determine whether or not the HTTP request is directed towards a search engine or other website that is considered unsafe. If the HTTP request is directed towards an unsafe search engine or other website, the outgoing traffic is redirected to a search engine that is considered safe by protocols within the present invention.

BACKGROUND OF THE INVENTION

Users of the Internet frequently visit websites that collect and store information about each user's activity. The websites typically collect and store information for a variety of reasons including, but not limited, to modifying the user's experience, reporting, demographic analysis, and optimizing revenue. User information is often used to target advertising, sold, traded and shared with other companies. The collection of user information through a search engine can be very valuable to a company as they can use it to boost their revenue. Information about a user retrieved from search engines is typically even more useful than information obtain elsewhere on the internet, since the use of a search engine requires a user to enter a search query which indicates their personal interest in a particular subject. Such subjects can often be very personal, and may damage the user's reputation or social standing if others were appraised of their interest in said subject. Resultantly, this logging and storage of information makes many Internet users very uncomfortable because they do not like the idea that someone could potentially view this logged information.

One of the most sensitive forms of an internet user's information is their web search activity and history. When an Internet user searches the Internet using a search engine, their query is often logged along with their Internet Protocol (IP) address and other information that may identify them personally. Over time, it becomes possible for a search engine company to gain a clear understanding of a person's problems, ailments, desires, and other very sensitive personal information by viewing a history of the user's web searches. This is the primary reason why many internet users are very uncomfortable with the thought of a search engine storing their past search queries. Of equal concern for users is having their search history used to assail the user with targeted advertisements on other websites or the possibility that their search history is sold to or shared with other companies. Targeted advertisements could be embarrassing for the user to see on other websites, particularly if another person is temporarily using their computer.

There is clearly a need for software which protects users from search engines which are known for logging and storing search query history information. Such software would help to improve a person's privacy on the internet, and help them protect their personally identifiable information and other data points. It is an objective of the present invention to help users protect data about their search engine usage patterns and search query history from collection and storage. The present invention accomplishes this by providing a software which is installed onto the user's computer, and actively monitors outgoing HTTP requests. The HTTP requests are analyzed to determine if the HTTP request is being directed to a search engine which is known for logging and storing user information. If it is determined that the HTTP request is directed towards one of these search engines, the software automatically reacts by redirecting the HTTP request to a search engine which does not store user search history. Lists of search engines and other URLs which compromise a user's privacy are maintained and refreshed from an external server or incorporated into the software application itself, so that the software can adequately determine and redirect the user's HTTP request to a comparable URL which does not compromise a user's privacy.

DETAILED DESCRIPTION OF THE INVENTION

All illustrations of the drawings are for the purpose of describing selected versions of the present invention and are not intended to limit the scope of the present invention.

Figure 1:
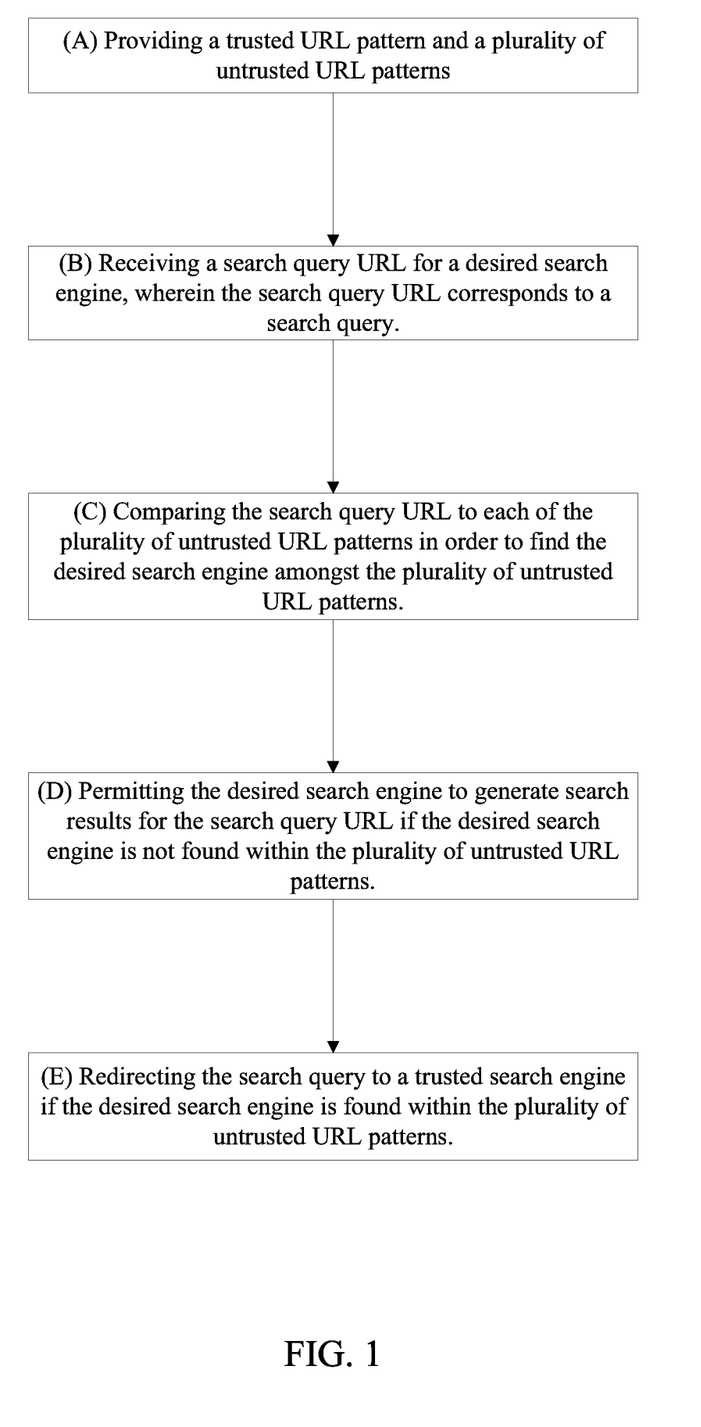
FIG. 1 is a flowchart describing the general process of the present invention.
Figure 2:
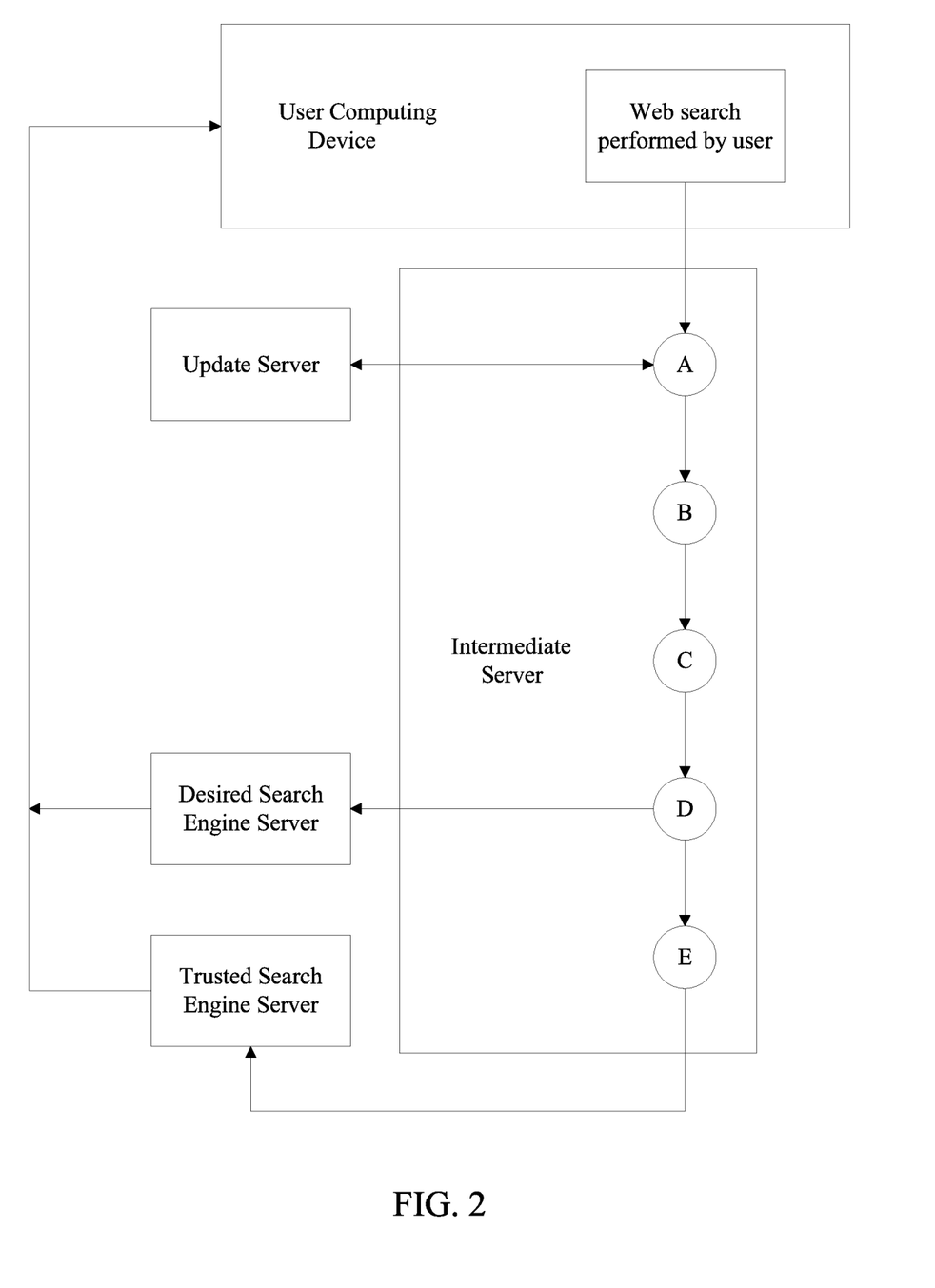
FIG. 2 is a workflow diagram for a first embodiment of the present invention.
Figure 3:
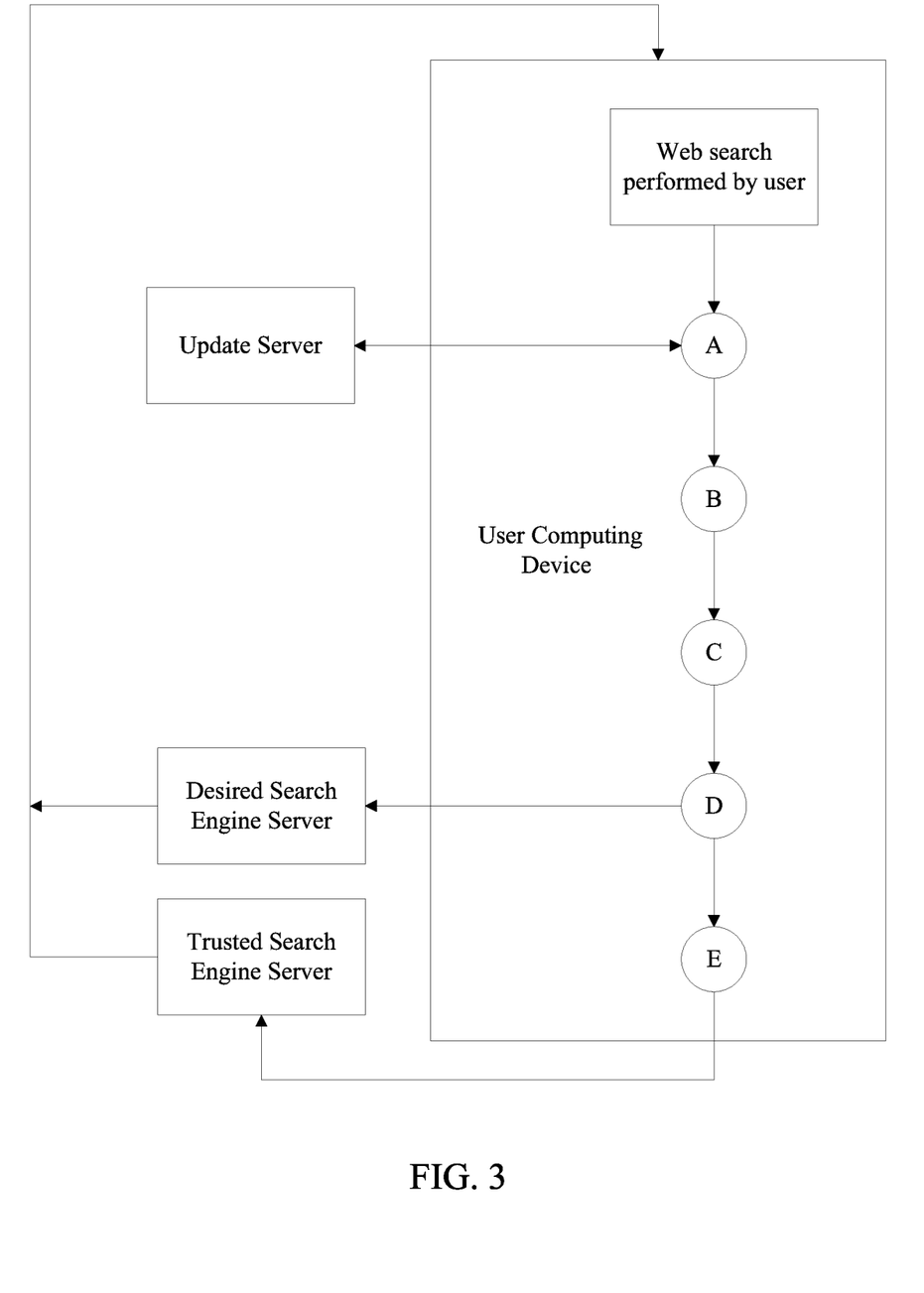
FIG. 3 is a workflow diagram for a second embodiment of the present invention.

With reference to FIGS. 1-3, the present invention is a method of redirecting search queries from an untrusted search engine to a trusted search engine by executing computer-executable instructions stored on a non-transitory computer-readable medium. Many search engines, which aid the user in finding certain websites, also store information about search queries which have been entered by the user. This information can be utilized by the company which operates the search engine to effectively build a profile of that particular user, especially since the search engine knows what Internet Protocol (IP) address the search queries originate from. To many internet users, this constitutes a very worrisome compromise of privacy, and the present invention works to counteract this privacy compromise. The present invention involves using a system and a method to detect whether a user is attempting to access a search engine that collects personal information and redirects a user's search to a trusted search engine if the original search engine is found to be untrusted.

The system of the present invention relies on a user computing device, such as a desktop computer, laptop, tablet, or smartphone, to initiate a search on a search engine. In one embodiment, the user computing device is also be responsible for monitoring and redirecting user searches. In another embodiment of the present invention, an intermediate server is provided to monitor and redirect user searches initiated by the user computing device. The intermediate server is a server that connected to the user computing device via the internet and is configured to intercept Hypertext Transfer Protocol (HTTP) requests and determine if said HTTP requests are attempting to access an untrusted search engine. Moreover, the intermediate server may be used with encrypted HTTP (HTTPS) requests. At least one trusted Uniform Resource Locator (URL) pattern and a plurality of untrusted URL patterns are also provided (Step A). The plurality of untrusted URL patterns is a list which stores patterns that define search engines considered unsafe for the user's privacy. The at least one trusted URL pattern is used to redirect an unsafe search to a trusted search engine. The at least one trusted URL pattern and the plurality of untrusted URL patterns can be stored on a user computing device manually or programmatically and may take the form of an Extensible Markup Language (XML) or JavaScript Object Notation (JSON) document, or other computer-readable format. Both the plurality of untrusted URL patterns and the at least one trusted URL pattern can contain partial or entire URLs which may include wildcards. Wildcards allow for additional strings or patterns to be associated with a single pattern, making each pattern more versatile in recognizing if the search query URL originates from an untrusted search engine. In one embodiment of the present invention, an update server is provided to update the at least one trusted URL pattern and the plurality of untrusted URL patterns. This is useful in the event that additional untrusted search engines are discovered.

In reference to FIG. 1, the method of the present invention is a software application that follows computer-executable instructions and is used to monitor searched performed by the user and redirect searches that are deemed unsafe. When a user accesses a desired search engine and initiates a search, the software application receives a search query URL for the desired search engine, wherein the search query URL corresponds to a search query (Step B). The desired search engine is simply the search engine that the user attempts to complete a search on. The desired search engine may be safe or unsafe. To determine if the desired search engine can be trusted, the search query URL is compared to each of the plurality of untrusted URL patterns in order to find the desired search engine amongst the plurality of untrusted URL patterns (Step C). If the desired search engine is not found within the plurality of untrusted URL patterns, the desired search engine is permitted to fulfill the request and generate search results for the search query URL (Step D). If the desired search engine is found within the plurality of untrusted URL patterns, the software application redirects the search query to a trusted search engine according the trusted URL pattern (Step E). The trusted search engine is a search engine that corresponds with the at least one trusted URL pattern and is known to be safe. One or more trusted search engines may be used various embodiments of the present invention. This process ensures that the user's personal information remains private by permitting searches through trusted sites and redirecting searches that are attempted on untrusted sites.

Figure 4:
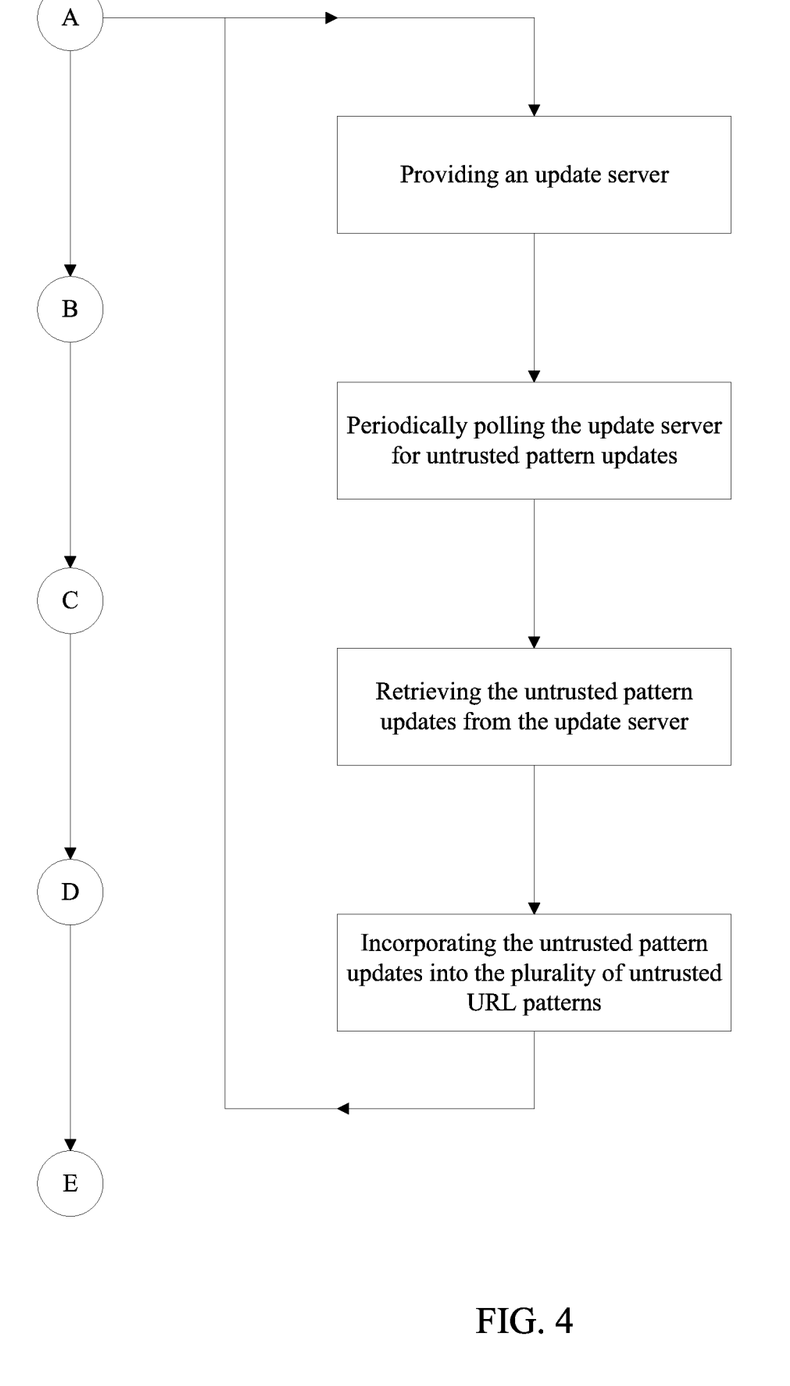
FIG. 4 is a flowchart describing the steps for updating the plurality of untrusted URL patterns.

As previously mentioned, some embodiments of the present invention use an update server to periodically update the plurality of untrusted URL patterns. In reference to FIGS. 2-4, when the update server is incorporated into the system of the present invention, the software application periodically polls the update server for untrusted pattern updates. Untrusted pattern updates may take the form of new or edited patterns, URLs, links, configuration files, icons, and other various types of information. If updates are available, the software application retrieves the untrusted pattern updates from the update server. The untrusted pattern updates are then incorporated into the plurality of URL patterns. This process is done such that new untrusted search engines may be identified if necessary. Moreover, this process allows the software application to continuously become more efficient in recognizing untrusted search engines.

Figure 5:
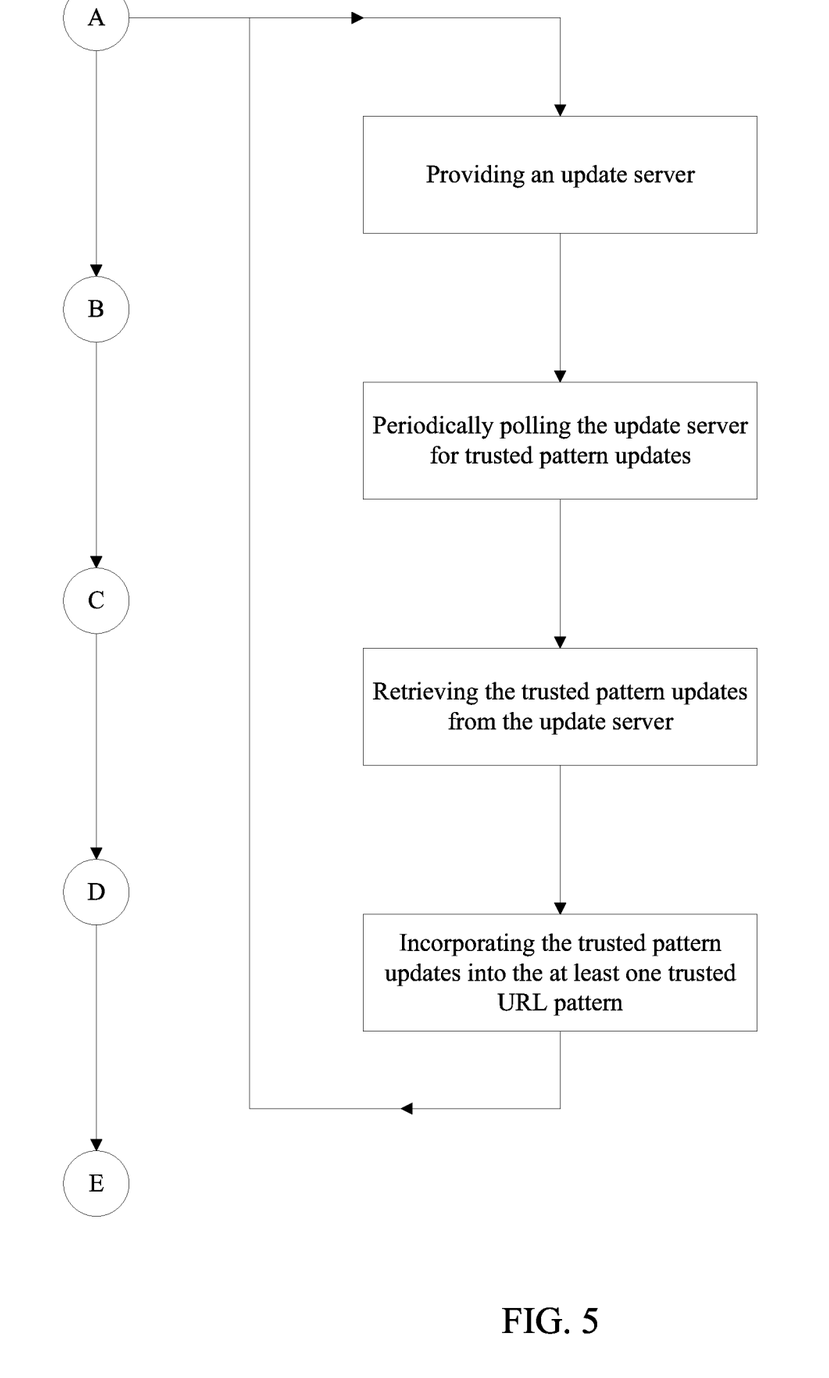
FIG. 5 is a flowchart describing the steps for updating the at least one trusted URL pattern.

In reference to FIGS. 2-3, and 5, like with the plurality of untrusted URL patterns, the update server can be used to make changes to the at least one trusted URL pattern. To do this, the software application periodically polls the update server for trusted pattern updates. Trusted pattern updates may take the form of new or edited patterns, URLs, links, configuration files, icons, and other various types of information. If updates are available, the software application retrieves the trusted pattern updates from the update server. The trusted pattern updates are then incorporated into the at least one trusted URL pattern. This process is done such that searches can be accurately redirected from untrusted search engines. Moreover, the at least one trusted URL pattern may be updated to allow for multiple trusted search engines to be used.

Figure 6:
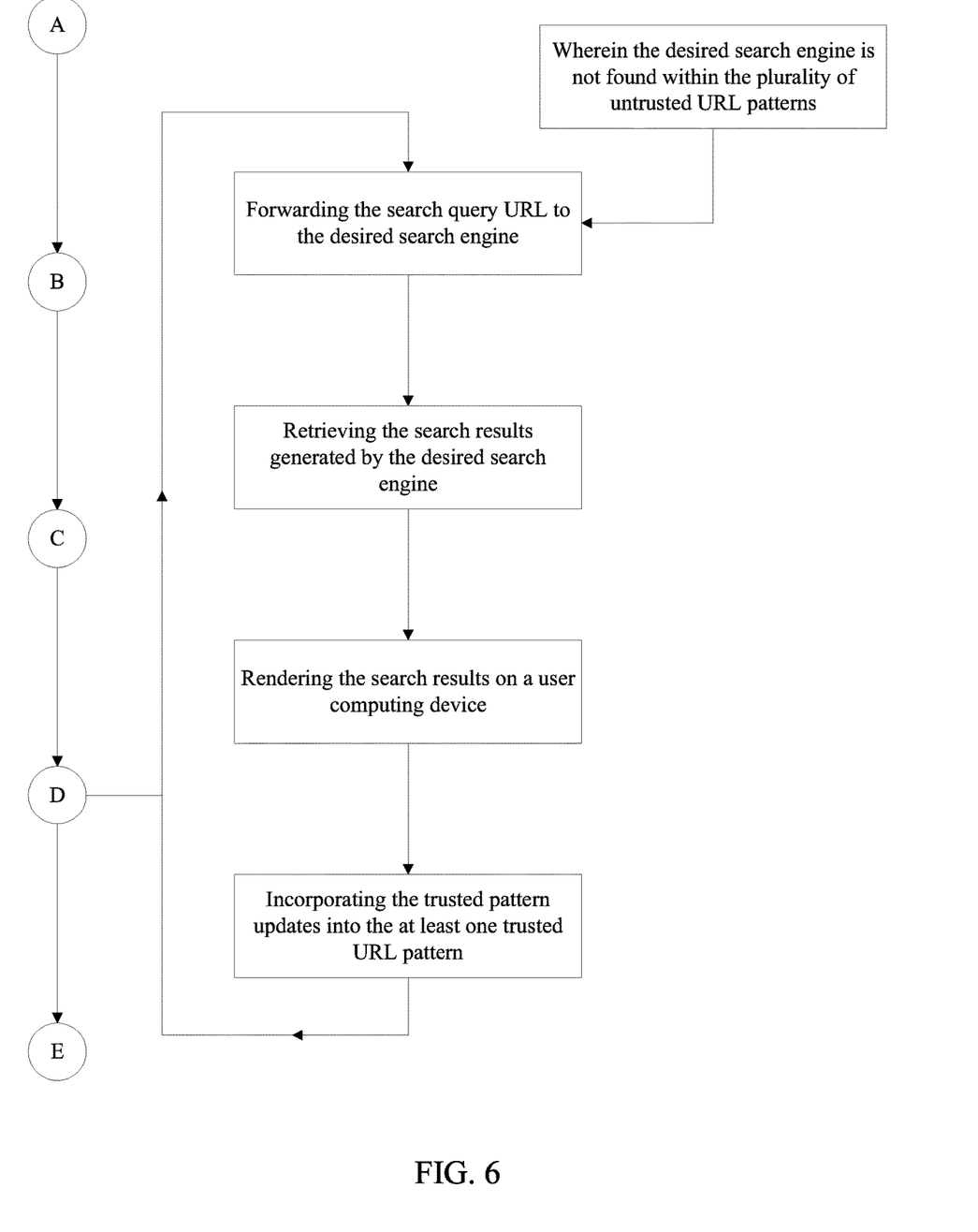
FIG. 6 is a flowchart describing the steps for permitting the desired search engine to generate search results.

In reference to FIG. 6, after the software application compares the search query URL with the plurality of untrusted URLs, the user's search is allowed to proceed, unencumbered, on the desired search engine if the desired search engine is not found within the plurality of URL patterns. To do this, the software application permits the search query to pass to the desired search engine. After the desired search engine generates results for the search, the software application receives the search results generated by the desired search engine. Then, the search results are rendered on the user computing device.

Figure 7:
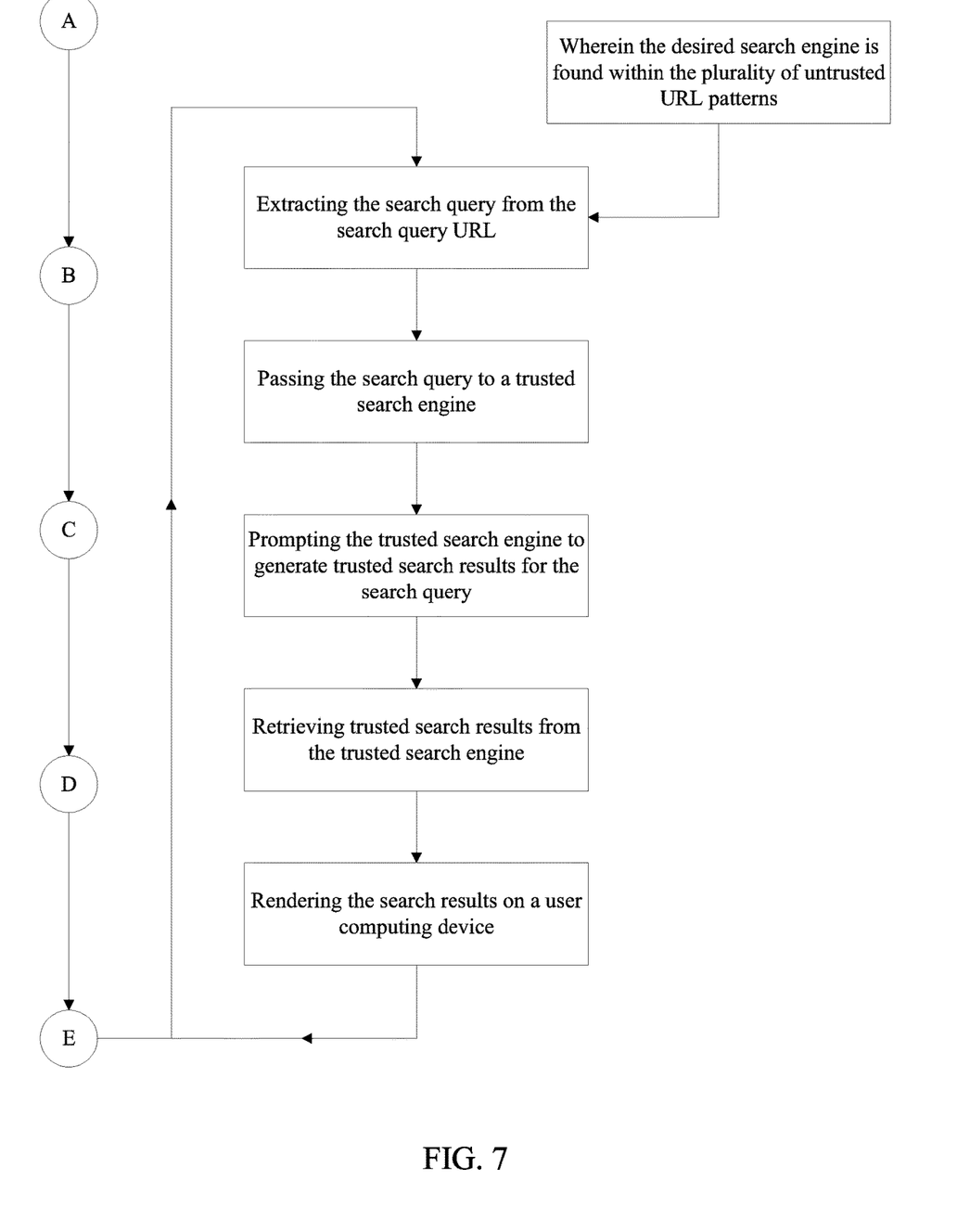
FIG. 7 is a flowchart describing the steps for redirecting a search to a trusted search engine.

In reference to FIG. 7, in the event that the desired search engine is found within the plurality of untrusted URL patterns, the software application proceeds by redirecting the search to the trusted search engine. To do this, the software application extracts the search query from the search query URL. The search query is then passed to the trusted search engine. The software application then retrieves the trusted search results from the trusted search engine and renders the search results on a user computing device. Because the user's search is redirected before communicating with the desired search engine, none of the user's personal information may be accessed by the desired search engine. Instead, the search is redirected to the trusted search engine which does not collect personal information.

Figure 8:
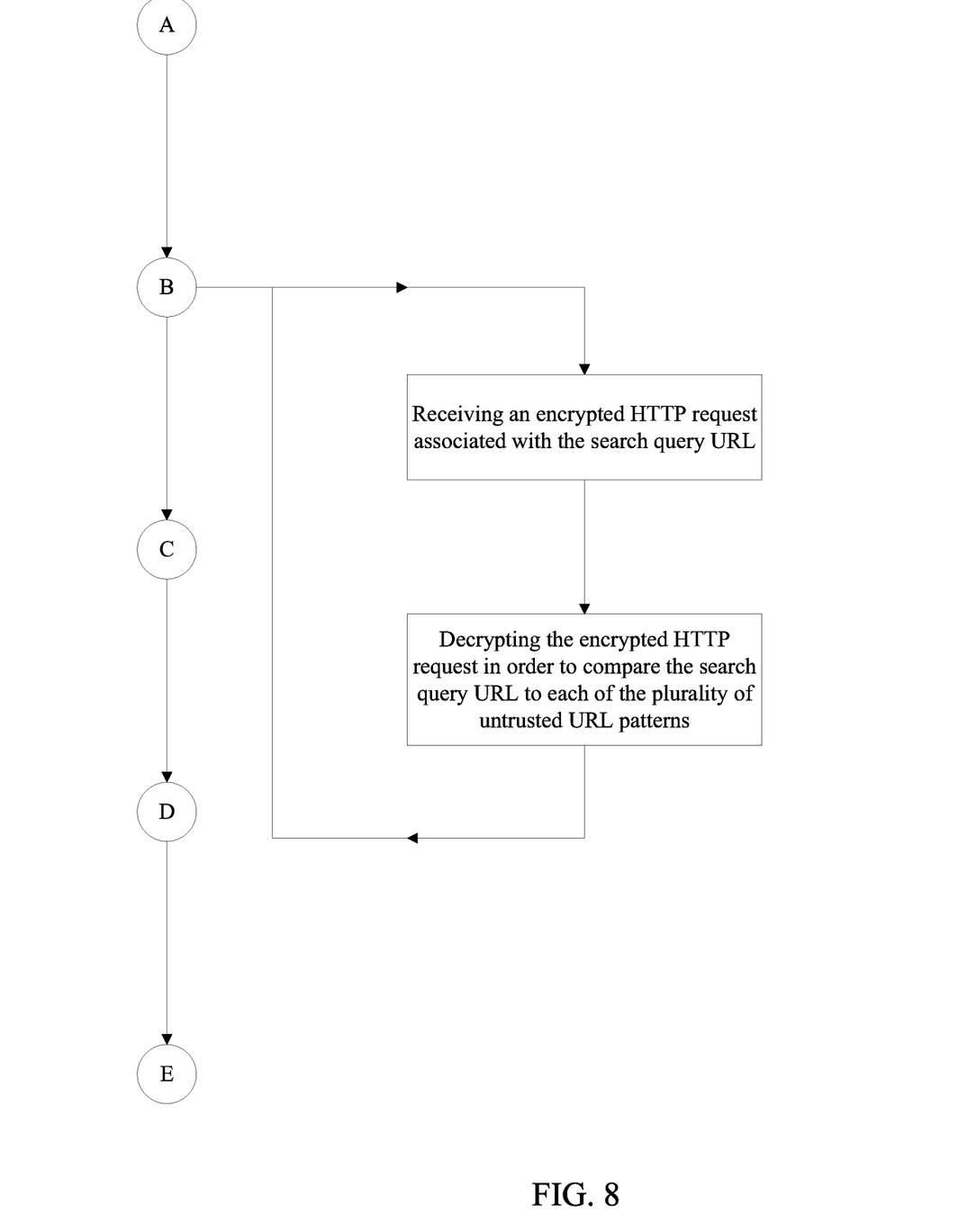
FIG. 8 is a flowchart describing the steps for decrypting encrypted HTTP requests.

There are two main embodiments for the system and method of the present invention. In the first embodiment of the present invention, steps A through E are performed solely by the user computing device. For this embodiment, the software application resides solely on the user computing device. This embodiment would likely be used for desktop computers, laptops, and other similar devices with higher processing power. In this embodiment, the software application may take the form of a web browser plug-in, a browser extension, a standalone web browser, or any other similar application with internet connectivity, including non-browser software. In a second embodiment of the present invention, the software application is used such that an intermediate server executes steps A through E, but some form of software or network connectivity configuration information is likely needed to allow the user computing device and the intermediate server to communicate seamlessly. In this embodiment, the search result generated during step E are sent to the user computing device. This embodiment is intended to be used for smartphones, tablets, and similar low powered internet-connected computing devices with less processing power. Any software of configuration information located on the user computing device may also the intermediate server to interpret encrypted information sent from the user computing device. Accordingly, step A can also include receiving an encrypted HTTP (HTTPS) request associated with the search query URL. This is shown in FIG. 8. The software application is then able to decrypt the HTTPS request in order to compare the search query URL to each of the plurality of untrusted URL patterns.

Although the invention has been explained in relation to its preferred embodiment, it is to be understood that many other possible modifications and variations can be made without departing from the spirit and scope of the invention as hereinafter claimed.

What is claimed is:

1. A method of redirecting search queries from an untrusted search engine to a trusted search engine by executing computer-executable instructions stored on a non-transitory computer-readable medium, the method comprising: providing at least one trusted Uniform Resource Locator (URL) pattern and a plurality of untrusted URL patterns, the at least one trusted URL pattern and the plurality of untrusted URL patterns each comprising a plurality of URLs with wildcards; receiving a search query URL originated from a desired search engine by initiating a search query on the desired search engine, the search query URL corresponding to a search query; comparing the search query URL with the plurality of untrusted URL patterns; permitting the desired search engine to generate search results for the search query in response to the search query URL not complying with each of the plurality of untrusted URL patterns; recognizing the desired search engine as an untrusted search engine and redirecting the search query to a trusted search engine according to the at least one trusted URL pattern in response to the search query URL complying with one of the plurality of untrusted URL patterns;

recognizing the desired search engine as the untrusted search engine and redirecting the search query to the trusted search engine according to the at least one trusted URL pattern comprising extracting the search query from the search query URL, passing the search query to the trusted search engine and receiving trusted search results generated by the trusted search engine: providing a user computing device; and rendering the trusted search results on the user computing device;

providing an update server; periodically polling the update server for untrusted pattern updates; retrieving the untrusted pattern updates from the update server; and incorporating the untrusted pattern updates into the plurality of untrusted URL patterns.

\* \* \* \* \*